United States Patent
Bart et al.

(10) Patent No.: US 10,893,206 B1
(45) Date of Patent: Jan. 12, 2021

(54) USER EXPERIENCE WITH DIGITAL ZOOM IN VIDEO FROM A CAMERA

(71) Applicant: Alarm.com Incorporated, Tysons, VA (US)

(72) Inventors: Gary Franklin Bart, Weston, FL (US); John Varn, Tysons, VA (US); Dean Constantine, Ft. Lauderdale, FL (US); Jaimin Hsu, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 79 days.

(21) Appl. No.: 16/214,898

(22) Filed: Dec. 10, 2018

Related U.S. Application Data

(60) Provisional application No. 62/597,253, filed on Dec. 11, 2017.

(51) Int. Cl.
*H04N 5/232* (2006.01)
*G06F 3/01* (2006.01)

(52) U.S. Cl.
CPC ......... *H04N 5/23296* (2013.01); *G06F 3/017* (2013.01); *H04N 5/232127* (2018.08)

(58) Field of Classification Search
None
See application file for complete search history.

(56) References Cited

U.S. PATENT DOCUMENTS

| | | | | |
|---|---|---|---|---|
| 7,110,025 | B1* | 9/2006 | Loui | H04N 21/64792 |
| | | | | 348/220.1 |
| 7,222,306 | B2* | 5/2007 | Kaasila | G06F 3/0481 |
| | | | | 715/801 |
| 9,369,678 | B2* | 6/2016 | Loher | H04N 7/183 |
| 2007/0165103 | A1* | 7/2007 | Arima | H04N 5/23203 |
| | | | | 348/14.01 |
| 2009/0128560 | A1* | 5/2009 | Schechter | G06T 11/001 |
| | | | | 345/421 |
| 2009/0232480 | A1* | 9/2009 | Jendbro | H04N 21/41407 |
| | | | | 386/224 |
| 2011/0072510 | A1* | 3/2011 | Cheswick | G06F 21/83 |
| | | | | 726/18 |
| 2012/0281062 | A1* | 11/2012 | Gu | H04N 21/440263 |
| | | | | 348/14.12 |
| 2015/0268822 | A1* | 9/2015 | Waggoner | G06F 3/167 |
| | | | | 715/722 |
| 2018/0183982 | A1* | 6/2018 | Lee | H04N 5/23296 |
| 2018/0284955 | A1* | 10/2018 | Canavor | G06Q 30/0635 |
| 2020/0014961 | A1* | 1/2020 | Ramaswamy | G06F 3/04842 |

* cited by examiner

*Primary Examiner* — Cynthia Segura
(74) *Attorney, Agent, or Firm* — Fish & Richardson P.C.

(57) ABSTRACT

Techniques are described for zooming in video. In some implementations, a first video stream from a camera is provided, a digitally zoomed portion of the first video stream from the camera is provided, a second video stream from the camera corresponding to the digitally zoomed portion of the first video stream is requested, and the digitally zoomed portion of the first video stream is replaced with the second video stream from the camera.

18 Claims, 2 Drawing Sheets ance Application No. 62/597,253, filed Dec. 11, 2017, and titled "IMPROVING USER EXPERIENCE WITH DIGITAL ZOOM IN VIDEO FROM A CAMERA," which is incorporated by reference in its entirety.

USER EXPERIENCE WITH DIGITAL ZOOM IN VIDEO FROM A CAMERA

CROSS-REFERENCE TO RELATED APPLICATION

This application claims the benefit of U.S. Provisional Application No. 62/597,253, filed Dec. 11, 2017, and titled "IMPROVING USER EXPERIENCE WITH DIGITAL ZOOM IN VIDEO FROM A CAMERA," which is incorporated by reference in its entirety.

TECHNICAL FIELD

This invention relates to the field of cameras.

BACKGROUND

Many video surveillance cameras allow for playback of live video streams to a remote device such as a tablet, smartphone, web browser on a computer, or private video monitor display. In most cases, the display resolution of the video stream shown on the remote device is predetermined and often is not the same as the resolution of the source surveillance camera.

As an example, a camera that is capable of recording at 4 k resolutions (2160p) may stream to a remote device at 1080p due to bandwidth and device limitations, resulting in the delivery of a video stream to a remote device that is lower resolution than the camera is capable of providing.

SUMMARY

Techniques are described for zooming in video from a camera.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for zooming in video from a camera. A camera surveillance system paired with a display device may enable a user to interact with displayed video to zoom in and out and pan around on a video stream. For example, a user may touch the display device and separate two fingers to zoom in and pinch two fingers to zoom out, or drag a single finger to pan around.

When a user zooms in, a system may take the video stream and magnify the portion of the video stream that is zoomed in on. In this approach, while the apparent size of the portion of the video stream increases the apparent resolution decreases. For example, if a portion of a video stream is magnified by four times then each pixel is magnified to be four identical pixels and the apparent resolution reduces by a factor of four. Pixilation may occur and discerning additional details may not be possible as those details may not appear in the original video stream.

In some instances, a camera may be capable of a higher resolution than the stream being sent for viewing. Accordingly, the camera may provide an updated video stream for a portion of the field of view of the camera that the user is now viewing, which would re-encode the smaller field of view at the same video stream resolution as the original video stream. For example, a camera sending a 1080p resolution video stream of the entire field of view of the camera where only a quarter is displayed on a remote device at an apparent resolution of 540p may send a 1080p resolution video stream of just that quarter of the entire field of view of the camera.

Additionally, if the user attempted to indicate the new field of view and the display does not respond until the adapted video stream is received, the apparent latency between input and display may cause an undesirable user experience as the system may seem slow to respond. Accordingly, the user device may initially display the original video stream and magnify portions of the original video stream as appropriate until the adapted video stream is available for display, and then replace the magnified portion of the original video stream with the adapted video stream. This may eliminate the appearance of latency in response to user inputs.

Figure 1:
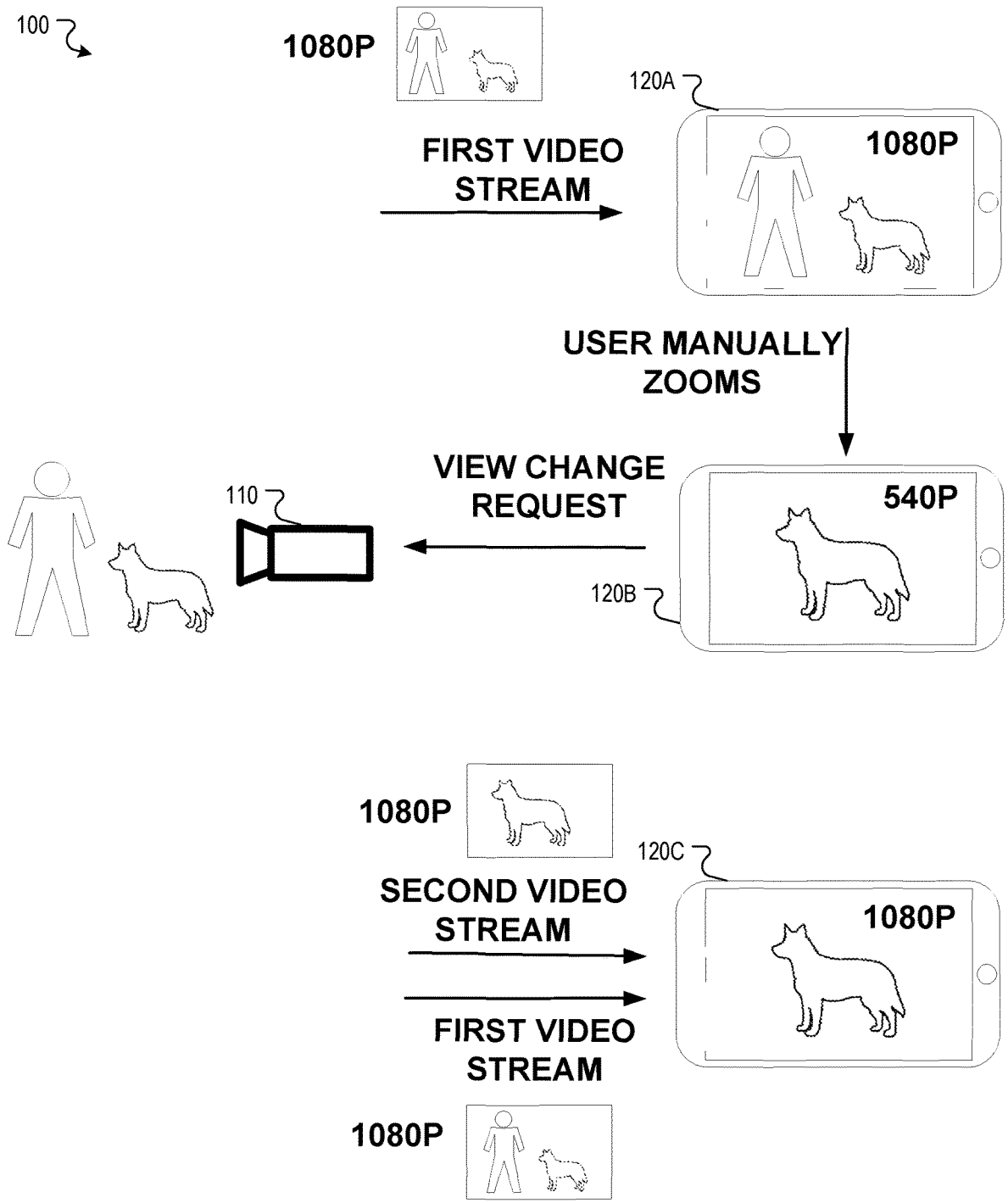
FIG. 1 illustrates an example block diagram of zooming in video from a camera.

FIG. 1 illustrates an example block diagram of a system 100 zooming in video from a camera 110. The system 100 includes a camera 110 and a display device 120 (referring to 120A, 120B, and 120C collectively). The camera 110 may provide one or more video streams of a scene. For example, the camera 110 may provide a first stream of an entire field of view of a camera at 1080p to the display device 120.

The camera 110 may determine a resolution for the video stream to the display device 120. For example, the camera 110 may determine that even though the camera 110 is capable of sensing at 2160p resolution and providing a video stream at 2160p, the transmission bandwidth with the display device 120 limits the resolution to 1080p and, in response, the camera 110 may provide a first video stream of an entire field of view at 1080p.

The camera 110 may receive a request from the display device 120 to change a view. For example, the camera 110 may receive an indication that indicates coordinates in the entire field of view and a number of pixels high and a number of pixels wide to include in the view. The camera 110 may provide a second video stream in response to the request. For example, the camera 110 may provide a second video stream with just those pixels requested at 1080p.

In some implementations, the camera 110 may obtain an indication of a portion of the field of view to provide and provide that portion field of view at the highest resolution that the camera 110 may provide. For example, camera 110 may obtain a request that is for a portion that is one sixteenth of the entire field of view but the camera may only sense pixels four times greater than the original video stream and provide a video stream for that one sixteenth of the entire resolution with one fourth the resolution as the original video stream, which is still greater than the one sixteenth resolution for that portion that the original video stream provided.

The display device 120 may be a device that a user interacts with to view a live video stream from the camera 110. For example, the display device 120 may be a tablet, a smartphone, a desktop computer, or some other type of device with a display. The display device 120 may enable a user to zoom in and out, and pan around a live video stream. For example, the display device 120 may enable a user to touch two fingers on a display and spread them to zoom in where the user touched.

While the user is zooming in and out or panning, the display device 120 may use the first stream and magnify various portions corresponding to the user's interactions. For example, when zoomed in on a quarter of the entire field of view, the display device 120 may magnify by a factor of four the corresponding quarter of the first video stream so that even though that quarter is shown with the same number of pixels as 1080p is shown, the apparent resolution is still 540p.

In response to detecting when a user has finished interacting with the display device 120 to change a view, the display device 120 may determine a portion of the field of view of the camera 110 to request and provide the request to the camera 110. For example, the display device 120 may determine that the user has zoomed in on a portion and hasn't changed the view in a predetermined amount of time, e.g., half a second, one second, two seconds, or some other amount of time, and that the upper left coordinate of a new view corresponds to the pixel coordinates (0,0) in the original video stream and covers 960 pixels wide and 540 pixels high of the original video stream. In response, the display device 120 may provide a request for a second video stream at 1080p with the upper left corresponding to the upper left most pixel in the original video stream and covering half of the width and half of the height of the original video stream.

The display device 120 may receive a second video stream in response to the request and once enough of the second video stream has buffered enough to be displayed, display the second video stream instead of the first video stream.

FIG. 1 illustrates an example use case where the camera 110 may be capable of providing a 2160P video stream but due to limitations, e.g., bandwidth limitations or a display on the device 120 with only a resolution of 1080P, the display device 120 is only capable of smoothly displaying a video stream at 1080P.

As shown in FIG. 1, the camera 110 may initially provide a first video stream of an entire field of view of the camera 110 and that may be displayed on the display device 120. For example, the camera 110 provides a first video stream of a person and a dog at 1080P.

A user may then manually zoom on a portion with the display device 120. The display device 120 may then magnify a portion of the first video stream. For example, the user may zoom in on the dog so that the dog fills the entire display. However, the apparent resolution of the digitally zoomed in dog is still 540P as the first video stream only included a resolution of 540P for that portion corresponding to the dog.

The display device 120 may then send a view change request to the camera 110 where the request indicates that a portion of the field of view of the camera 110 is to be provided at an increased resolution. For example, the display device 120 may provide the pixel coordinates in the first video stream corresponding to the four corners shown on the display device 120. The camera 110 may provide a second video stream corresponding to the requested view at an increased resolution. For example, the camera 110 may provide a second video stream showing the dog without the person at a resolution of 1080P.

The camera 110 may additionally continue providing the first video stream so that when the user interacts again with the display device 120, the display device 120 may zoom in and out, and pan around using the first video stream. For example, without the first video stream, when a user zooms out on the display device 120 the portion including the person may not be available so the display device 120 may display black portions for all portions that aren't included in the second video stream.

Accordingly, when the display device 120 is displaying the second video stream and determines that a user is interacting with the display device 120 to pan out or zoom out, the display device 120 may identify a portion of the first video stream that corresponds to the new panned or zoomed out view and then magnify that portion of the first video stream to fill a display of the display device 120. For example, the display device 120 may determine that a user is viewing a second video stream showing a dog without a person at a resolution of 1080P, determine that a user has panned and, in response, identify a portion of the first video stream that corresponds to the panned view, and then magnify that portion to fill the display at an apparent resolution of 540P. Accordingly, switching between the two video streams may enable smooth and contiguous panning and zooming out while enabling providing potentially higher apparent resolution.

In some implementations, when panning or zooming the display device 120 may identify a portion of the first video stream that corresponds to the new panned or zoomed out view and combine that with a portion of the second video stream to show a portion with greater apparent resolution and a portion with lower apparent resolution. For example, the display device 120 may determine a user is panning so that a right half of the second video stream corresponds to the left half of what's to be displayed on the display device 120 and the right half of what's to be displayed in the display device 120 is only available for the first video stream and, in response, display the right half of the second video stream at the same 1080P resolution and display the portion of the first video stream that corresponds to the right half of what's to be displayed on the display device 120 magnified to fill that right half at an apparent resolution of 540P.

Additionally or alternatively, in some implementations instead of continuing to send the first video stream, the camera 110 may send images of an entire field of view at various times and the display device 120 may use the most recently received image for zooming in and out and panning. For example, the camera 110 may be limited in the number of simultaneous streams of video the camera 110 may provide so be unable to provide both a first video stream of an entire field of view and a second video stream of a partial field of field. Accordingly, the camera 110 may send images of the entire field of view every ten seconds or when the camera 110 detects a substantial change in an appearance of the entire field of view, and once a user interacts with the display device 120 to zoom or pan, zoom in and out or pan with the most recently received image.

Additionally or alternatively, in some implementations the camera 110 may adjust the image resolution of an area in response to video analytics, such as focusing on an area where motion has been detected, framing that area and tracking that motion for the viewer. For example, the camera 110 may determine that a dog has appeared and provide another video stream focusing on a portion of the field of view including the dog at a resolution that is higher than the resolution for a portion of the field of view in a video stream of the entire field of view of the camera 110.

Additionally or alternatively, the system 100 may enable a user to set various areas of focus that would automatically be presented to the viewer in the highest resolution possible for the camera 110. For example, the camera 110 may continually provide at least two streams, a first stream corresponding to an entire field of view, a second stream corresponding to a pre-set portion of the entire field of view at the same resolution, and a third stream of view if the user zooms in on another portion of the field of view. Accordingly, the display device 120 may not need to wait to buffer a video stream when zooming in on the pre-set portion of the entire field of view as the display device 120 may already have the second stream available and buffered.

Figure 2:
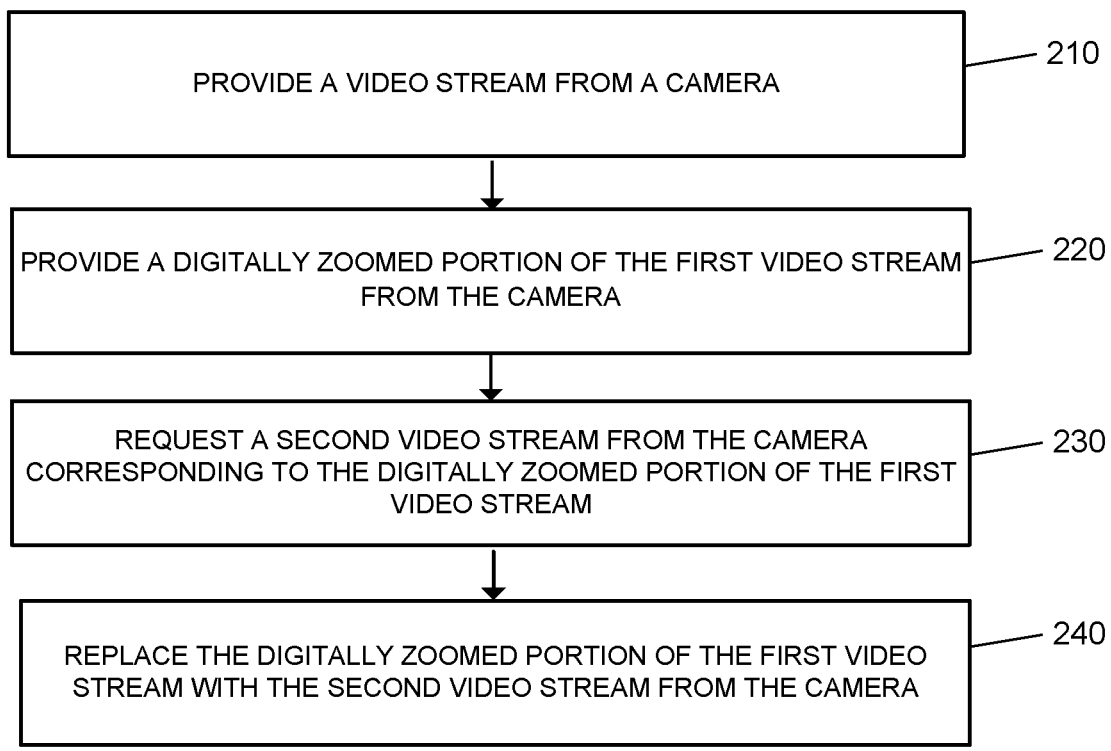
FIG. 2 is a flow diagram of an example process for zooming in video from a camera.

FIG. 2 is a flow diagram of an example process 200 for zooming in video from a camera. The process 200 can be implemented using system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The process 200 includes providing a first video stream from a camera (210). For example, the display device 120 may display the first video stream from the camera 110. In some implementations, providing a first video stream from the camera includes receiving, from the camera, the first video stream that corresponds to an entire field of view of the camera and outputting the first video stream on a display. For example, the display device 120 may obtain a first video stream of an entire field of view from the camera 110 and display the video stream to a user.

In some implementations, receiving, from the camera, the first video stream that corresponds to an entire field of view of the camera includes receiving, from the camera, the first video stream a resolution less than a maximum resolution that the camera can sense. For example, the display device 120 may receive video stream of an entire field of view of the camera 110 at 1080p even though the camera 110 may be capable of recording at 2160p. The first video stream may be at a resolution less than a maximum resolution that the camera 110 can sense for a variety of reasons including, for example, limited bandwidth between the camera 110 and the display device 120 or limited processing available on the display device 120 to render the first video stream.

The process 200 includes providing a digitally zoomed portion of the first video stream from the camera (220). Digitally zoomed may refer to magnifying a portion of the first video stream. For example, the display device 120 may receive inputs from a user to zoom in on a portion of the field of view of the camera and display magnified portions of the first video stream.

In some implementations, providing a digitally zoomed portion of the first video stream from the camera includes magnifying a portion of the first video stream and outputting the portion of the first video stream that is magnified on a display. For example, the display device 120 may magnify a quarter portion of a 1080p first video stream by a factor of four by displaying four pixels that match each pixel in the quarter portion of the first video stream such that the quarter portion is displayed with a resolution of 1080p but is only based on data from the 960×540 quarter portion of the first video stream.

In some implementations, providing a digitally zoomed portion of the first video stream from the camera is in response to receiving user input that indicates to zoom in. For example, the display device 120 may detect two fingers touching the display are being separated to indicate to zoom in and, in response, magnify a portion of the first video stream corresponding to where the fingers were separated.

The process 200 includes requesting a second video stream from the camera corresponding to the digitally zoomed portion of the first video stream (230). For example, the display device 120 may provide a request to the camera 110 that indicates a digitally zoomed in portion of the first video stream displayed on the display device 120.

In some implementations, requesting a second video stream from the camera corresponding to the digitally zoomed portion of the first video stream includes providing, to the camera, an indication of coordinates in the first video stream to zoom into. For example, the display device 120 may transmit to the camera 110 the coordinates of the four corners of the digitally zoomed portion within the first video stream, e.g., transmit coordinates of (0, 0), (540, 0), (0, 540), and (540, 540) to indicate to zoom in on an upper left corner of a 1080p video stream.

The process 200 includes replacing the digitally zoomed portion of the first video stream with the second video stream from the camera (240). For example, the display device 120 may display the digitally zoomed in portion of the first video stream and when the display device 120 determines that the second video stream is sufficiently buffered to display, in response, replace displaying the digitally zoomed in portion of the first video stream with the second video stream.

In some implementations, replacing the digitally zoomed portion of the first video stream with the second video stream from the camera includes determining that the second video stream is sufficiently buffered to display and in response to determining that the second video stream is sufficiently buffered to display, outputting the second video stream on a display instead of the digitally zoomed portion of the first video stream from the camera. For example, the display device 120 may determine that after five seconds of receiving data for the second video stream, sufficient data has been buffered for the second video stream such that the second video stream may be displayed without freezing and, in response, the display device 120 may cease displaying the first video stream and instead display the second video stream.

The process 200 may include receiving user input that indicates to zoom out, in response to receiving the user input that indicates to zoom out, requesting the camera stop providing the second video stream from the camera while providing the first video stream from the camera, and providing the first video stream from the camera. For example, the display device 120 may continuously receive the first video stream whether or not receiving the second video stream, detect that a user has made a pinch in gesture to return the view on the display device 120 back to the entire view represented by the first video stream, in response to detection of the pinch in gesture provide an instruction to the camera 110 to cease providing the second video stream, and output the first video stream on a display.

The process 200 may include receiving user input that indicates to zoom out, in response to receiving the user input that indicates to zoom out, requesting the first video stream from the camera, and providing the first video stream from the camera. For example, the display device 120 may stop receiving the first video stream while receiving the second video stream, detect that a user has made a pinch in gesture to return the view on the display device 120 back to the entire view represented by the first video stream, in response to detection of the pinch in gesture provide an instruction to the camera 110 to provide the first video stream instead of the second video stream, and output the first video stream on a display once the display device 120 determines the first video stream has sufficiently buffered on the display device 120 to be shown without freezing.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    receiving a first video stream from a camera, wherein the first video stream corresponds to an entire field of view of the camera that is at a resolution less than a maximum resolution that the camera can sense for the entire field of view;
    providing the first video stream from the camera;
    providing a digitally zoomed portion of the first video stream from the camera;
    requesting a second video stream from the camera corresponding to the digitally zoomed portion of the first video stream, wherein the second video stream corresponds to the digitally zoomed portion of the first video stream and is at least at a maximum resolution that the camera can sense for the digitally zoomed portion;
    receiving the second video stream from the camera;
    replacing the digitally zoomed portion of the first video stream with the second video stream from the camera while continuing to receive the first video stream from the camera;
    receiving user input that indicates to zoom out; and
    in response to receiving the user input that indicates to zoom out, requesting the camera stop providing the second video stream from the camera.

2. The method of claim 1, wherein replacing the digitally zoomed portion of the first video stream with the second video stream from the camera comprises:
    determining that the second video stream is sufficiently buffered to display; and
    in response to determining that the second video stream is sufficiently buffered to display, outputting the second video stream on a display instead of the digitally zoomed portion of the first video stream from the camera.

3. The method of claim 1, wherein providing a first video stream from the camera comprises:
    receiving, from the camera, the first video stream that corresponds to an entire field of view of the camera; and
    outputting the first video stream on a display.

4. The method of claim 1, wherein providing a digitally zoomed portion of the first video stream from the camera comprises:
    magnifying a portion of the first video stream; and
    outputting the portion of the first video stream that is magnified on a display.

5. The method of claim 1, wherein providing a digitally zoomed portion of the first video stream from the camera is in response to receiving user input that indicates to zoom in.

6. The method of claim 1, wherein requesting a second video stream from the camera corresponding to the digitally zoomed portion of the first video stream comprises:
    providing, to the camera, an indication of coordinates in the first video stream to zoom into.

7. The method of claim 1, comprising:
    receiving user input that indicates to zoom out;
    in response to receiving the user input that indicates to zoom out, requesting the camera stop providing the second video stream from the camera while providing the first video stream from the camera; and
    providing the first video stream from the camera.

8. The method of claim 1, comprising:
    receiving user input that indicates to zoom out;
    in response to receiving the user input that indicates to zoom out, requesting the first video stream from the camera; and
    providing the first video stream from the camera.

9. The method of claim 1, comprising:
    in response to receiving the user input that indicates to zoom out, determining that a first portion of a view of the camera to show is available from the second video stream and a second portion of the view of the camera to show is not available from the second video stream; and
    simultaneously displaying the first portion of the view of the camera from the second video stream and the second portion of the view of the camera from the first video stream.

10. A system comprising:
    one or more computers and one or more storage devices storing instructions that are operable, when executed by the one or more computers, to cause the one or more computers to perform operations comprising:

receiving a first video stream from a camera, wherein the first video stream corresponds to an entire field of view of the camera that is at a resolution less than a maximum resolution that the camera can sense for the entire field of view;

providing the first video stream from the camera;

providing a digitally zoomed portion of the first video stream from the camera;

requesting a second video stream from the camera corresponding to the digitally zoomed portion of the first video stream, wherein the second video stream corresponds to the digitally zoomed portion of the first video stream and is at least at a maximum resolution that the camera can sense for the digitally zoomed portion;

receiving the second video stream from the camera;

replacing the digitally zoomed portion of the first video stream with the second video stream from the camera while continuing to receive the first video stream from the camera;

receiving user input that indicates to zoom out; and in response to receiving the user input that indicates to zoom out, requesting the camera stop providing the second video stream from the camera.

11. The system of claim 10, wherein replacing the digitally zoomed portion of the first video stream with the second video stream from the camera comprises:

determining that the second video stream is sufficiently buffered to display; and in response to determining that the second video stream is sufficiently buffered to display, outputting the second video stream on a display instead of the digitally zoomed portion of the first video stream from the camera.

12. The system of claim 10, wherein providing a first video stream from the camera comprises:

receiving, from the camera, the first video stream that corresponds to an entire field of view of the camera; and outputting the first video stream on a display.

13. The system of claim 10, wherein providing a digitally zoomed portion of the first video stream from the camera comprises:

magnifying a portion of the first video stream; and outputting the portion of the first video stream that is magnified on a display.

14. The system of claim 10, wherein providing a digitally zoomed portion of the first video stream from the camera is in response to receiving user input that indicates to zoom in.

15. The system of claim 10, wherein requesting a second video stream from the camera corresponding to the digitally zoomed portion of the first video stream comprises:

providing, to the camera, an indication of coordinates in the first video stream to zoom into.

16. A non-transitory computer-readable medium storing software comprising instructions executable by one or more computers which, upon such execution, cause the one or more computers to perform operations comprising:

receiving a first video stream from a camera, wherein the first video stream corresponds to an entire field of view of the camera that is at a resolution less than a maximum resolution that the camera can sense for the entire field of view;

providing the first video stream from the camera;

providing a digitally zoomed portion of the first video stream from the camera;

requesting a second video stream from the camera corresponding to the digitally zoomed portion of the first video stream, wherein the second video stream corresponds to the digitally zoomed portion of the first video stream and is at least at a maximum resolution that the camera can sense for the digitally zoomed portion;

receiving the second video stream from the camera;

replacing the digitally zoomed portion of the first video stream with the second video stream from the camera while continuing to receive the first video stream from the camera;

receiving user input that indicates to zoom out; and in response to receiving the user input that indicates to zoom out, requesting the camera stop providing the second video stream from the camera.

17. The medium of claim 16, wherein replacing the digitally zoomed portion of the first video stream with the second video stream from the camera comprises:

determining that the second video stream is sufficiently buffered to display; and in response to determining that the second video stream is sufficiently buffered to display, outputting the second video stream on a display instead of the digitally zoomed portion of the first video stream from the camera.

18. The medium of claim 16, wherein providing a first video stream from the camera comprises:

receiving, from the camera, the first video stream that corresponds to an entire field of view of the camera; and outputting the first video stream on a display.

* * * * *